US006162976A

United States Patent [19]

[11] Patent Number: 6,162,976
[45] Date of Patent: Dec. 19, 2000

Clausen

[54] FURNITURE INCORPORATING A PERCUSSION INSTRUMENT AND METHOD FOR FORMING THE SAME

[76] Inventor: Tor C. Clausen, 606 13th Ave. SE., Olympia, Wash. 98501

[21] Appl. No.: 09/330,538

[22] Filed: Jun. 11, 1999

[51] Int. Cl.[7] .......... G01D 13/08

[52] U.S. Cl. .......... 84/402; 84/403; 84/180

[58] Field of Search .......... D17/1; 84/403, 84/405, 174, 177, 180, 402, 410, DIG. 17, 102, 103, 104, 108

[56] References Cited

U.S. PATENT DOCUMENTS

| | | | |
|---|---|---|---|
| D. 150,575 | 8/1948 | Jay | D17/1 |
| 223,394 | 1/1880 | Schrenkeisen | 84/95.1 |
| D. 314,003 | 1/1991 | Dean | D17/23 |
| 504,071 | 8/1893 | Von Wascinski | 84/285 |
| 1,790,008 | 1/1931 | Janssen | 84/177 |
| 2,640,385 | 6/1953 | Carlson | 84/405 |
| 2,704,482 | 3/1955 | Zimmerman | 84/403 |
| 2,785,595 | 3/1957 | Smith | 84/402 |
| 2,812,680 | 11/1957 | Fedoryszyn | 84/102 |
| 2,844,986 | 7/1958 | Boda | 84/405 |
| 3,443,469 | 5/1969 | Hiraoka | 84/410 |
| 3,590,679 | 7/1971 | Law | 84/102 |
| 3,776,091 | 12/1973 | Suzuki | 84/403 |
| 5,686,679 | 11/1997 | Nakano et al. | 84/402 |

FOREIGN PATENT DOCUMENTS

| | | |
|---|---|---|
| 612476 | 10/1926 | France . |
| 17134 | 6/1981 | Germany . |
| 48069 | 1/1989 | Germany . |
| 94390 | 1/1939 | Sweden . |
| 9122 | 9/1989 | United Kingdom . |

OTHER PUBLICATIONS

Musser Catalog, Musser, Brookfield, Illinios, pp. 4, 5, and 13.

*Primary Examiner*—David Martin
*Assistant Examiner*—Marlon Fletcher
*Attorney, Agent, or Firm*—Graybeal Jackson Haley LLP

[57] ABSTRACT

A furniture piece incorporates a percussion element such as a key that can generate a musical sound. For example, the top of a coffee table may incorporate a set of tuned keys that together form a xylophone-like instrument. Thus, not only can one use the table for conventional purposes, he/she can also play the keys for enjoyment.

23 Claims, 5 Drawing Sheets

*FIG. 3*
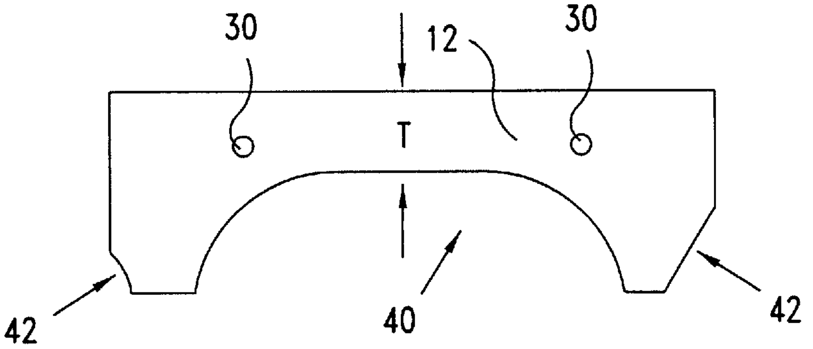
*FIG. 4*
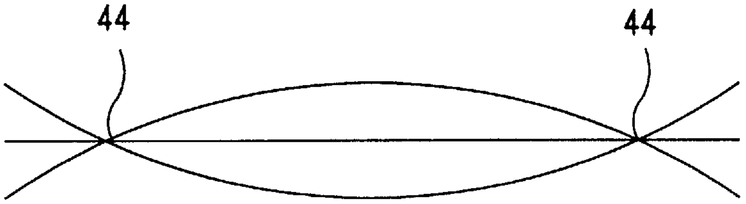
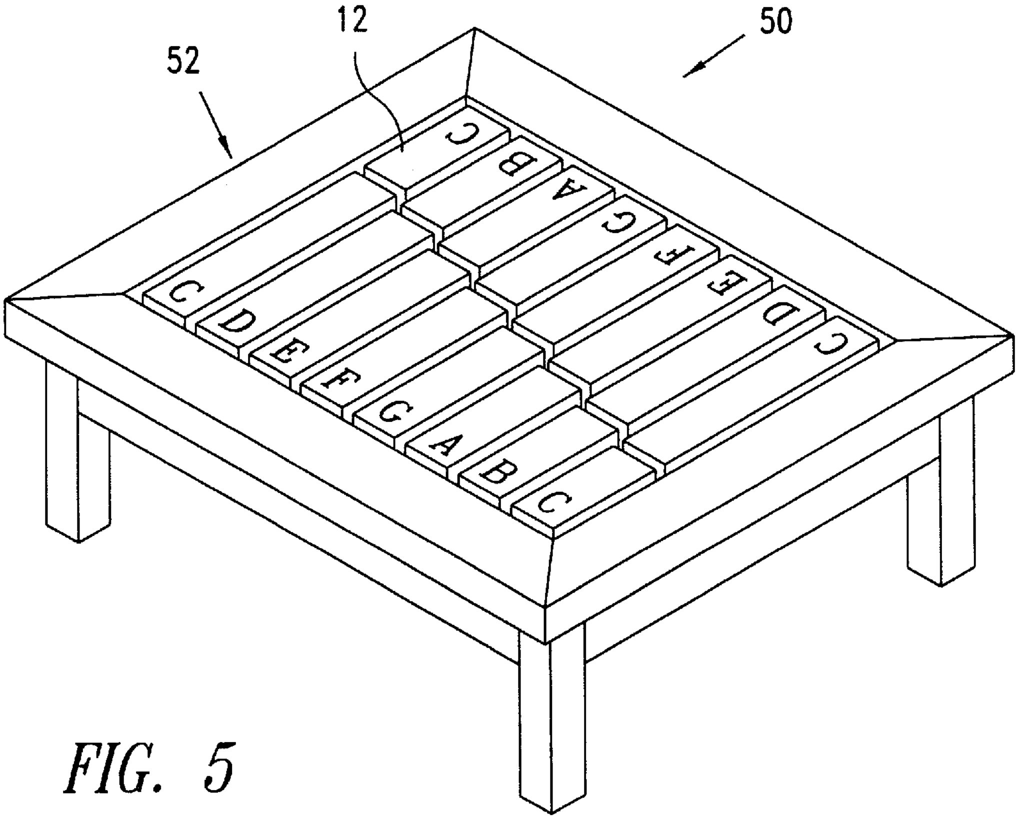
*FIG. 5*

FURNITURE INCORPORATING A PERCUSSION INSTRUMENT AND METHOD FOR FORMING THE SAME

TECHNICAL FIELD

This invention pertains generally to articles of manufacture, and pertains more particularly to furniture pieces such as tables, chairs, benches, and chests that incorporate percussion instruments such as tuned keys.

BACKGROUND

Although today's furniture pieces come in many styles and levels of quality, each piece is typically constructed for a narrow range of uses. For example, regardless of style or quality, chairs and benches are made for people to sit on, tables are made to hold items, and chests are made to store items.

Unfortunately, most of today's furniture pieces provide few, if any, features for entertaining the people who use them.

SUMMARY OF THE INVENTION

In one aspect of the invention, a furniture piece incorporates a percussion element such as a key that can generate a musical sound. For example, the top of a coffee table may incorporate a set of tuned keys that together form a xylophone-like instrument. Thus, not only can one use the table for conventional purposes, he/she can also play the keys for enjoyment.

BRIEF DESCRIPTION OF THE DRAWINGS

FIG. 3 is a side view of a key of FIG. 1.

FIG. 4 is a diagram of the vibration that generates the first harmonic tone of the tuned key of FIG. 3.

FIG. 5 is a perspective view of a table having a tabletop that incorporates two sets of keys according to an embodiment of the invention.

DETAILED DESCRIPTION OF THE INVENTION

Figure 1:
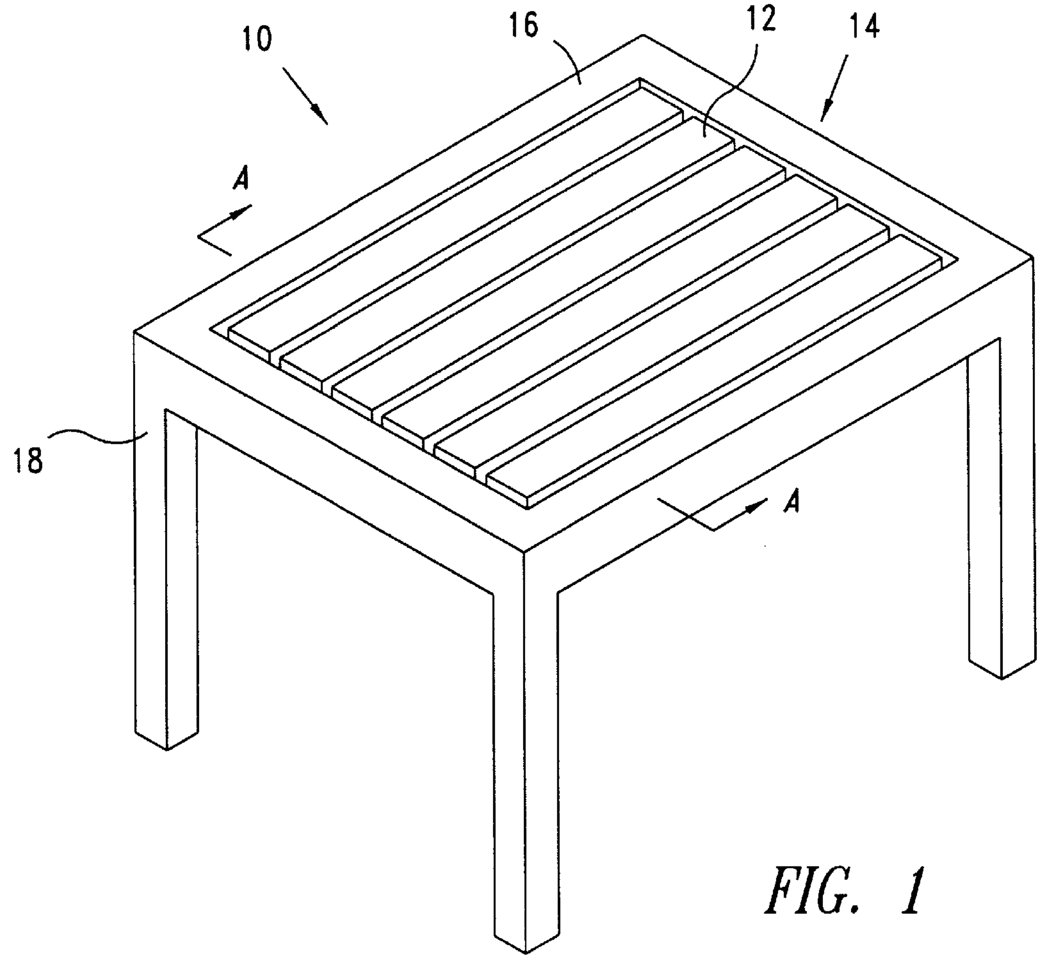
FIG. 1 is a perspective view of a table having a table top that incorporates a set of keys according to an embodiment of the invention.

FIG. 1 is a perspective view of a table 10, which incorporates keys 12 according to an embodiment of the invention. One can play the keys 12, i.e., cause the keys 12 to generate musical sounds, by striking them with a xylophone mallet or other conventional striking device. The keys 12 form a center portion of a tabletop 14 having a peripheral tabletop frame 16, and table legs 18 are attached to the frame

16 and support the tabletop 14. Each of the keys 12 is generally rectangular and has approximately the same length and width as the other keys 12. In one embodiment, the keys 12 are tuned to the respective notes of a musical scale like the keys of a xylophone. For example, the tabletop 14 may include eight keys 12 that are respectively tuned to the musical notes C, D, E, F, G, A, B, C in the key of C. Alternatively, the tabletop 14 may include thirteen keys 12 that are respectively tuned to the notes C, C#, D, D#, E, F, F#, G, G#, A, A#, B, and C. The keys 12 may also be tuned to other notes and other musical scales, and the "#" keys may be darker than the other keys like they are on a piano keyboard. Furthermore, the keys 12 are mounted to the tabletop frame 16 such that they can bear a load. Therefore, in addition to using the table 10 as a musical instrument, one can place items such as dinner ware (not shown) on the tabletop 14 and otherwise use the table 10 just as he/she would use a conventional table.

Figure 2:
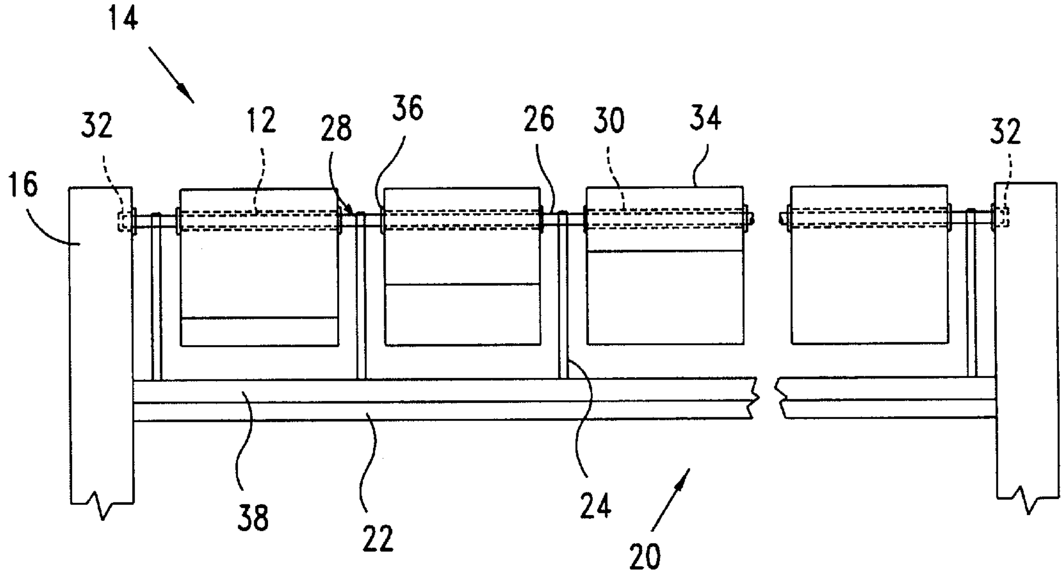
FIG. 2 is a cut-away side view of the tabletop of FIG. 1 taken along line A—A.

FIG. 2 is a cut-away side view of the tabletop 14 taken along line A—A of FIG. 1 to expose a key mounting structure 20 according to an embodiment of the invention. Although in this embodiment the tabletop 14 includes two or more structures 20, for clarity only one structure 20 is shown. The structure 20 includes a cross beam 22, which is conventionally attached to the tabletop frame 16 and which extends beneath the keys 12. Supports 24 are conventionally mounted to the beams 22, and a support rod 26 extends through openings 28 in the supports 24 and through support channels 30 conventionally formed in the keys 12. The ends of the rod 26 may also extend into support openings 32 conventionally formed in the tabletop frame 16. The support channels 30 are disposed at substantially uniform heights with respect to the keys 12 such that top surfaces 34 of the keys 12 are generally co-planar with each other and the tabletop frame 16. Spacers 36 may be located between the keys 12 such that one key 12 does not contact, and thus does not damp the vibrations of, an adjacent key 12. Furthermore, a sheath (not shown) may be disposed around the rod 26 to allow the keys 12 to vibrate more freely. In one embodiment, the supports 24 are cotter pins, the rod 26 is a fiberglass or metal rod, the spacers 36 are felt or nylon spacers, and the sheath is a nylon sheath.

Referring to FIGS. 1 and 2, one can use the tabletop 14 in a conventional manner. Specifically, one can place an item (not shown) such as a plate or book on one or more of the keys 12, and the support structure 20 allows the tabletop 14 to support the item as a conventional tabletop would. Specifically, the rod 26 supports the item and the key or keys 12 upon which the item is placed, the members 24 support the rod 26, and the cross beam 22 supports the members 24.

As discussed above, one can also play the tabletop 14 by striking the keys 12 with a mallet (not shown). Because the diameters of the support channels 30 are wider than the diameter of the rod 26 and because the supports 24 and the spacers 36 separate the keys 12 from one another, the keys 12 are free to vibrate. Consequently, when one strikes a key 12, it resonates about the rod 26 and thus produces a musical sound.

Referring again to FIG. 2, in another embodiment of the support structure 20, a rope (not shown) replaces the rod 26, and the support members 24 are omitted. The rope is conventionally attached to the tabletop frame 16 and suspends the keys 12 above the crossbeam 22. Because the rope is more flexible than the rod 26, the rope tends to dampen the vibration of the keys 12 less than the rod 26 does. Furthermore, although an item resting on one or more of the keys 12 may cause the rope to sag, the rope can only sag to a point where the key or keys come to rest on the crossbeam 22. Therefore, like the embodiment discussed above, this embodiment of the support structure 20 also allows one to place items on the tabletop 14 (FIG. 1) in a conventional manner.

Still referring to FIG. 2, in another embodiment, the tabletop 14 includes a resonator 38 for amplifying and focusing the sound from the vibrating keys 12. In one embodiment, the resonator 38 is a sheet of plywood that is mounted to the top of the crossbeam 22 approximately ¼" to ½" from the lowest points of the bottoms of the keys 12. The supports 24 may extend through the resonator 38 to the crossbeam 22 or may be conventionally attached to the resonator. In another embodiment, the tabletop 14 includes a separate resonator (not shown) for each key 12. For example, the tabletop 14 can include a respective conventional pipe resonator for each key 12. A pipe resonator is a cylinder having a length that corresponds to the wavelength of the first harmonic tone generated by a corresponding key 12. An open end of the cylinder is approximately ¼" to ½" from the bottom of the key 12; the other end of the cylinder is closed. The closed end may include a screw cap that allows one to fine tune the resonator to the tone of the key 12.

FIG. 3 is a side view of a key 12 from FIGS. 1 and 2. The key 12 includes a scalloped region 40 between the two support channels 30, which in one embodiment are aligned with the nodal points of the key 12 as described below in conjunction with FIG. 4. The thickness T of the key 12 in the scalloped region 40 determines the frequency at which the key 12 resonates, and thus determines the musical sound the key 12 generates when struck. Generally, the narrower the thickness T, the lower the pitch that the key 12 generates, and the wider the thickness T, the higher the pitch. The key 12 may also include one or more chamfered regions 42, which are outside of the two support channels 30. Generally, the less mass the key 12 has outside of the channels 30, the higher the pitch that the key 12 generates. Thus, when tuning the key 12, a craftsperson (not shown) can increase the pitch by removing material from the key 12 in the chamfered regions 42 and can reduce the pitch by removing material from the key 12 in the scalloped region 40. The craftsperson can fine tune the key 12 by using a hacksaw (not shown) to make one or more notches (not shown) in the scalloped region or the chamfered regions.

The key 12 is made from a conventional material such as wood or metal. Generally, the fewer knots and other flaws that a wooden key 12 has, the higher the quality of the sound it will produce. In one embodiment, the key 12 is made from quarter-sawn wood, which often provides a better sound than conventionally sawn wood.

Still referring to FIG. 3, with the scalloping/chamfering tuning technique described above, the keys 12 can have the same length yet produce musical sounds having significantly different pitches when struck. Having keys of approximately the same length significantly simplifies the construction of the tabletop 14 (FIG. 1). In another embodiment, however, the craftsperson varies the lengths of the keys 12 to adjust their respective pitches. In yet another embodiment, the craftsperson uses a combination of the scalloping/chamfering and length-varying techniques to tune the keys 12.

FIG. 4 illustrates the sinusoidal vibration of the tuned key 12 of FIG. 3 as it generates a tone. When struck, the key 12 flexes in a sinusoidal manner about two nodes, i.e., nodal points, 44 to generate the first harmonic tone of the key 12. The nodal points 44 are the sinusoidal "zeroes". That is, the nodal points 44 remain relatively stationary as the portions of the key 12 outside of and between the points 44 flex up and down. Generally, the nodal points 44 are each located 17–27% of the key length from the respective ends of the key 12. For example, if the key 12 is one meter long, then the nodal points 44 may be respectively located approximately 0.2 meters from each end of the key 12. Furthermore, although the key 12 may vibrate at higher harmonics and thus have other nodal points associated with these harmonics, the first harmonic is the dominant harmonic in the illustrated embodiment. Therefore, because the higher harmonics are negligible, their associated nodal points can be ignored in this embodiment. Nevertheless, these higher harmonics may be significant enough to prevent the key 12 from generating a pure tone when struck.

Still referring to FIGS. 3 and 4, there are many conventional techniques for determining the locations of the nodal points 44. On method entails putting sand on top of the key 12, striking the key 12, and observing the shifting patterns of the grains of sand as the key 12 vibrates. The grains of sand over the nodal points 44 will remain relatively stationary, and the grains of sand at other points along the key 16 will tend to gravitate toward the nodal points 44. Consequently, in one embodiment, the craftsperson identifies the approximate location of the nodal points 44 as half way between the top and bottom of the key 12 at the two points on the key surface where the sand grains have congregated.

As stated above, in one embodiment the support channels 30 are aligned with the nodal points 44. Because the nodal points 44 remain relatively stationary during key vibration, this alignment allows the key 12 to vibrate freely with minimum damping from the rod 26. If the nodal points 44 of each key 12 in the tabletop 14 (FIG. 1) are not aligned with each other when the keys are placed side by side, then the channels 30 and the rod 26 can be angled with respect to the keys 12 so that they intersect portions of the respective nodal points 44. Or, the rod 26 can be shaped like steps so that the channels 30 of each key 12 can be aligned with the respective nodal point 44 and the rod 26 can extend through all of the channels 30 even though they are not aligned from key to key. Alternatively, the channels 30 can be aligned from key to key even if the nodal points 44 are not so aligned. In one related embodiment, the channels 30 are located such that the rod 26 extends along a straight line that best approximates the positions of the respective nodal points 44 of the keys 12.

FIG. 5 is a perspective view of a table 50 according to another embodiment of the invention. The table 50 has a tabletop 52 with two sets of keys 12 arranged to form two xylophone-like instruments on opposite sides of the table 50. Therefore, two players can sit across from one another and play the respective set of keys 12. In the illustrated embodiment, the keys have different lengths, and the support rods 26 (not shown in FIG. 5) are angled with respect to the keys 12. In another embodiment, however, the keys 12 each have approximately the same length. The structures and uses of the table 50, tabletop 52, and keys 12 are otherwise similar to the structures and uses of the table 10 as discussed above in conjunction with FIGS. 1–4.

Figure 6:
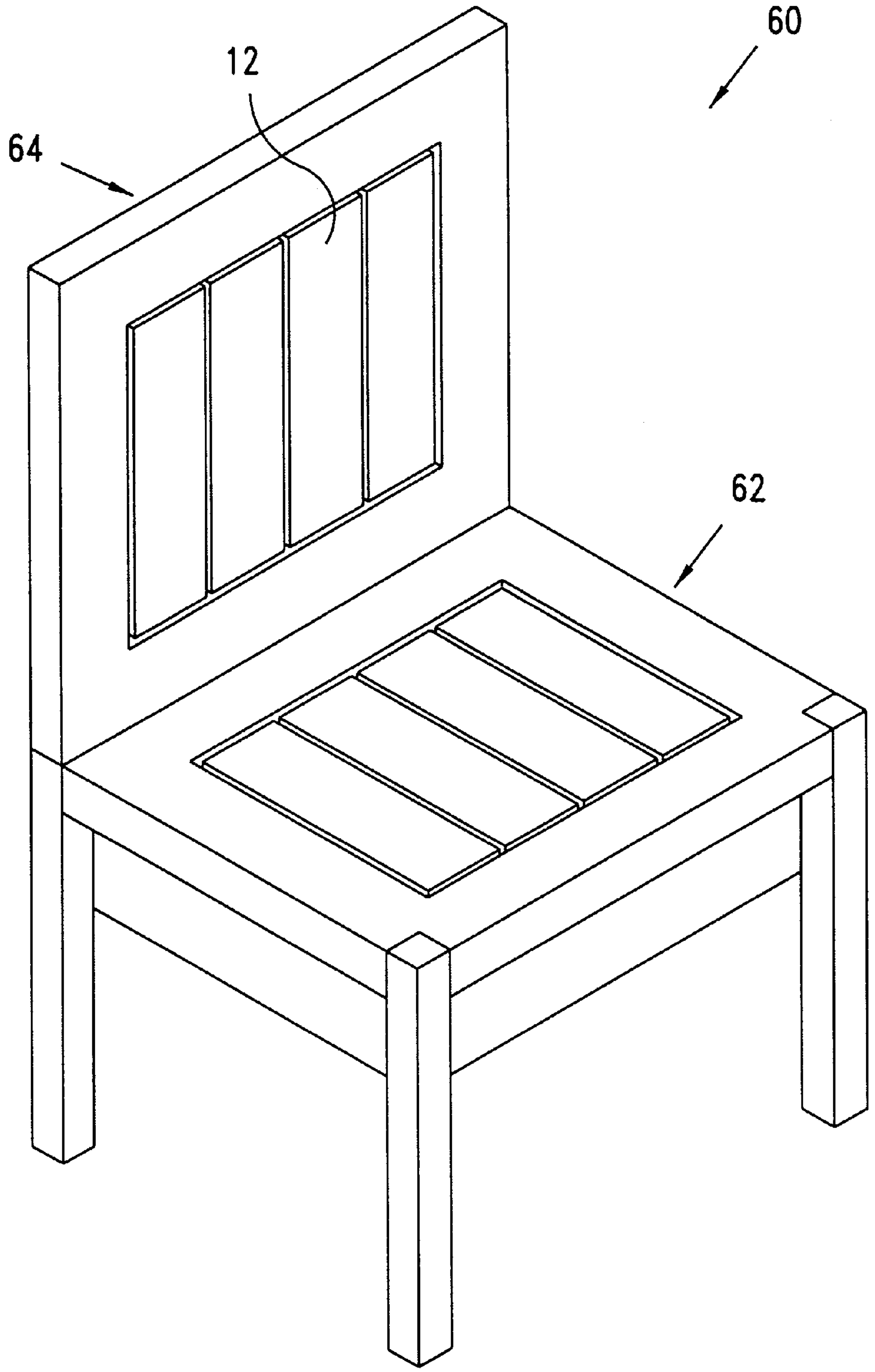
FIG. 6 is a perspective view of a chair having a seat and a back that incorporate respective sets of keys according to an embodiment of the invention.

FIG. 6 is a perspective view of a chair 60 having a seat 62 and a back 64, which incorporate respective sets of tuned keys 12 according to an embodiment of the invention. In one embodiment, the keys 12 are constructed and mounted in a manner similar to that described above in conjunction with FIGS. 1–4.

Figure 7:
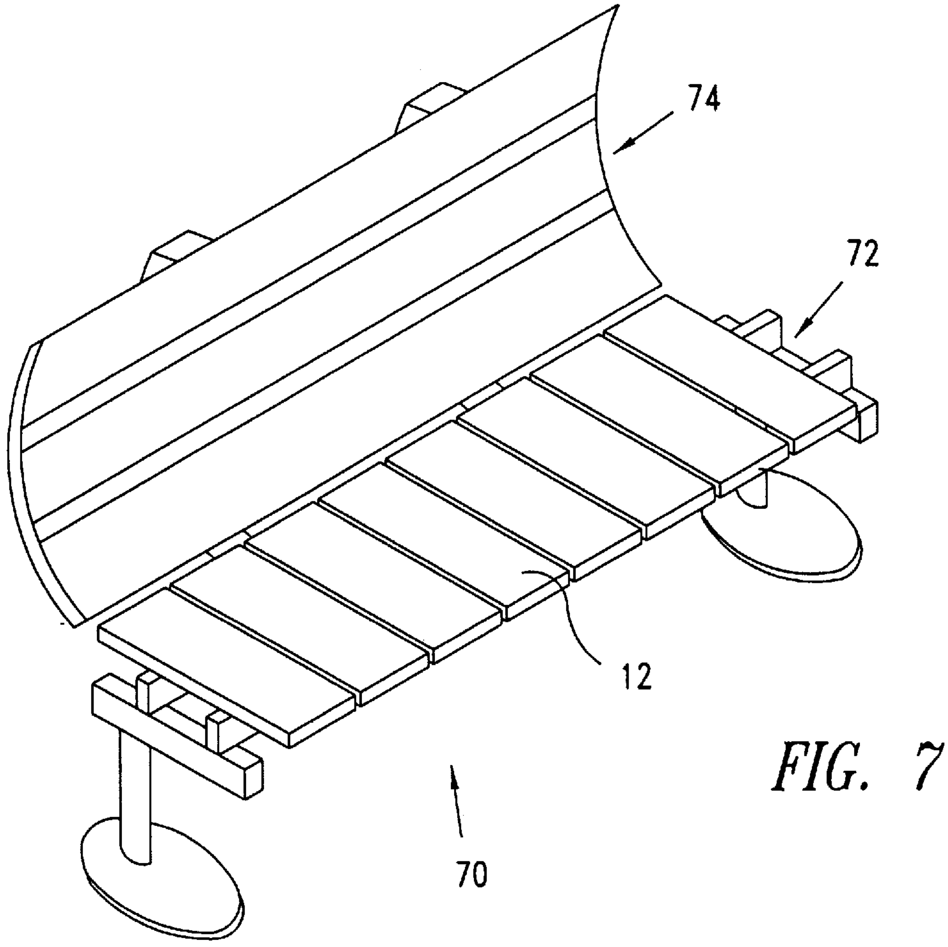
FIG. 7 is a perspective view of a bench having a seat that incorporates a set of keys according to an embodiment of the invention.

FIG. 7 is a perspective view of a bench 70 having a seat 72, which incorporates a set of tuned keys 12 according to an embodiment of the invention. The bench 70 also has a back 74, which may also incorporate a set of tuned keys 12. In one embodiment, the keys 12 are constructed and mounted in a manner similar to that described above in conjunction with FIGS. 1–4.

Figure 8:
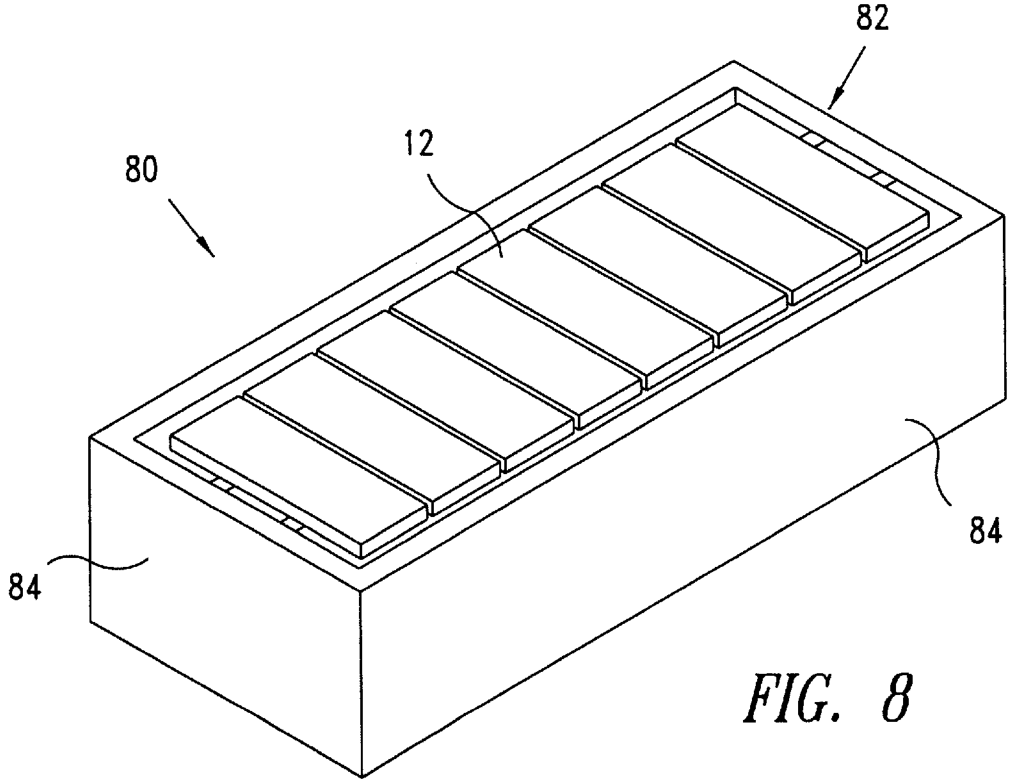
FIG. 8 is a perspective view of a chest having a lid that incorporates a set of keys according to an embodiment of the invention.

FIG. 8 is a perspective view of a chest 80 having a lid 82, which incorporates a set of tuned keys 12 according to an embodiment of the invention. The chest 80 also has sides 84, which may also incorporate respective sets of tuned keys 12. In one embodiment, the keys 12 are constructed and mounted in a manner similar to that described above in conjunction with FIGS. 1–4.

Figure 9:
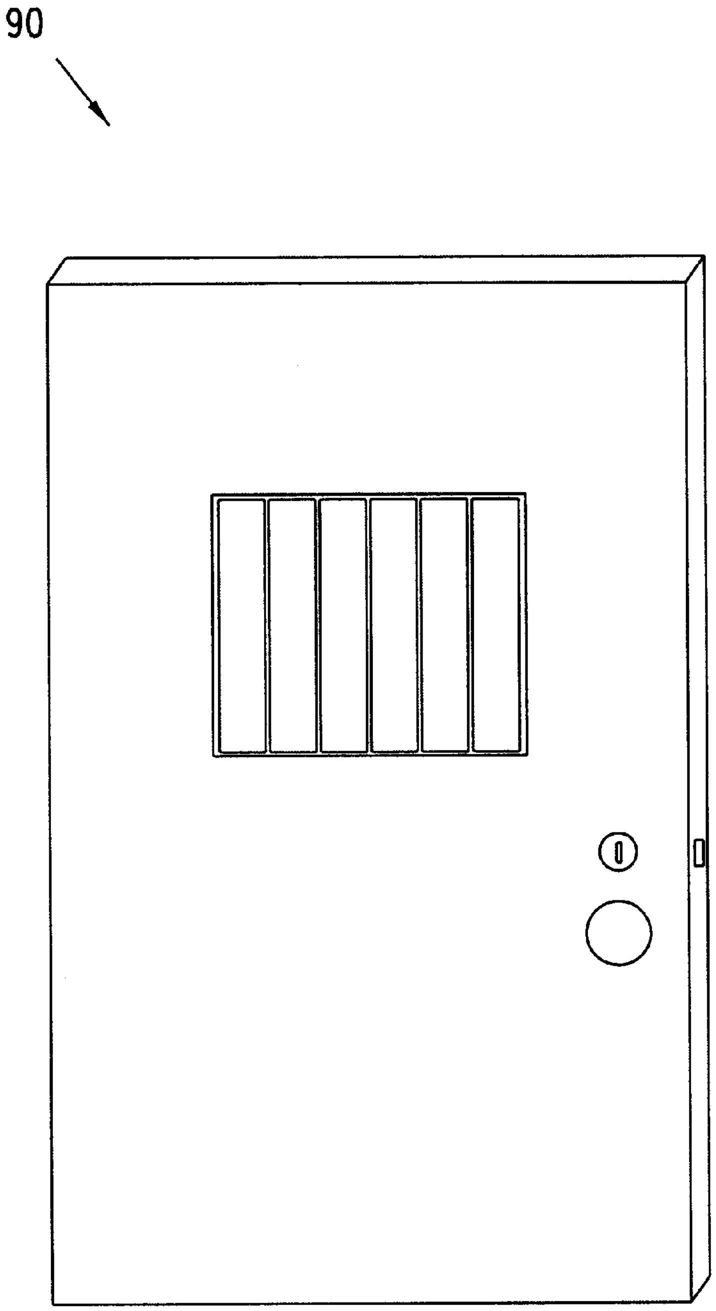
FIG. 9 is a perspective view of a door that incorporates a set of keys according to an embodiment of the invention.

FIG. 9 is a perspective view of a door 90, which incorporates a set of tuned keys 12 according to an embodiment of the invention. For example, one may play the keys 12 to announce his/her presence, just as one rings a door bell to announce his/her presence. In one embodiment, the keys 12 are constructed and mounted in a manner similar to that described above in conjunction with FIGS. 1–4.

From the foregoing it will be appreciated that, although specific embodiments of the invention have been described herein for purposes of illustration, various modifications may be made without deviating from the spirit and scope of the invention. For example, cylinders or other percussion elements may be substituted for the keys 12 of FIGS. 1–3 and 5–9. In addition, the keys 12 or other percussion elements may not be tuned to produce a conventional musical scale, or may be left in their original untuned states.

What is claimed is:

1. A table, comprising:

a table top having a planar surface and a periphery, the table top comprising, a frame disposed along the periphery of the table top and having a planar surface that composes a portion of the table-top surface, a support structure attached to the frame, and at least one key mounted to the support structure, the key having a planar surface that composes a portion of the table-top surface and that is coplanar with the surface of the frame, the key being operable to generate a musical sound by vibrating; and at least one leg attached to the frame or to the support structure and operable to support the table top.

2. The table of claim 1 wherein:

the key and frame surfaces are coplanar with a remaining portion of the table-top surface.

3. The table of claim 1 wherein:

the at least one key comprises a support channel disposed therein; and the support structure further comprises a key-mounting member that extends through the support channel.

4. The table of claim 1 wherein:

the at least one key comprises a support channel disposed therein; and the support structure comprises, a key-support beam mounted to the frame, a key-mounting-member support mounted to the beam; and a stiff key-mounting member mounted to the key-mounting-member support and extending through the support channel of the at least one key.

5. The table of claim 1 wherein:

the at least one key has an edge; and a portion the frame is adjacent to the edge of the key.

6. The table of claim 1 wherein the table top further comprises a plurality of keys mounted to the support structure, the keys each having a respective planar surface that composes a respective portion of the table-top surface and that is coplanar with the surface of the frame, each key being operable to generate a respective musical sound by vibrating, and each key having the same length as the other keys.

7. The table of claim 1 wherein:

the key comprises a side opposite to the key surface; and the table top further comprises a resonator mounted to the support structure and adjacent to the side of the key.

8. The table of claim 1 wherein the table top further comprises a plurality of keys mounted to the support structure, the keys each having a respective planar surface that composes a respective portion of the table-top surface and that is coplanar with the surface of the frame, each key being operable to generate a respective musical note of a musical scale by vibrating, and each key having the same length as the other keys.

9. The table of claim 1 wherein the table top further comprises a plurality of keys mounted to the support structure, the keys each having a respective planar surface that composes a respective portion of the table-top surface and that is coplanar with the surface of the frame, each key being operable to generate a respective musical note of a musical scale by vibrating, each key having the same length as the other keys, the keys being adjacent to one another and ordered from a highest to a lowest pitch.

10. The table of claim 1 wherein the at least one key is made from wood.

11. A storage apparatus, comprising:

a hollow body for holding items, the body having an opening for receiving the items; and a lid mounted to the body and operable to move between an open position for exposing the opening and a closed position for covering the opening, the lid having a periphery and comprising, a frame disposed along the periphery of the lid, a support structure attached to the frame, and at least one key mounted to the support structure, the key being operable to generate a musical sound by vibrating.

12. The storage apparatus of claim 11 wherein:

the frame has a planar surface;

the at least one key has a planar surface; and the key surface is coplanar with the frame surface.

13. The storage apparatus of claim 11 wherein:

the at least one key comprises a support channel disposed therein; and the support structure comprises a key-mounting member that is attached to the frame and that extends through the support channel.

14. The storage apparatus of claim 11 wherein:

the at least one key comprises a support channel disposed therein; and the support structure comprises, a key-support beam, a key-mounting-member support mounted to the beam, and a key-mounting member mounted to the key-mounting-member support and extending through the support channel of the at least one key.

15. The storage apparatus of claim 11 wherein the lid further comprises a plurality of keys mounted to the support structure, the keys each being operable to generate a respective musical sound by vibrating and each having the same length as the other keys.

16. A sitting apparatus, comprising:

a seat having a planar sitting surface and a periphery, the seat comprising, a frame disposed along the periphery of the seat and having a planar surface that composes a portion of the sitting surface, a support structure, and at least one key mounted to the support structure, the key having a planar surface that composes a portion of the sitting surface and that is coplanar with the surface of the frame, the key being operable to generate a musical sound by vibrating; and at least one member coupled to the frame or to the support structure and operable to support the seat.

17. The sitting apparatus of claim 16 wherein the seat further comprises:

a plurality of keys mounted to the support structure, the keys each being operable to generate a respective musical sound by vibrating, each having the same length as the other keys, and each having a respective planar surface that composes a respective portion of the sitting surface and that is coplanar with the surfaces of the frame and the other keys.

18. A table, comprising:

a table top having a planar surface, a periphery, and first and second opposite sides, the table top comprising, a frame disposed alone the periphery of the table top and having a planar surface that composes a portion of the table-top surface, a support structure attached to the frame, first and second sets of keys respectively mounted to the support structure on the first and second sides of the table top, each of the keys having a respective planar surface that composes a respective portion of the table-top surface and that is coplanar with the surface of the frame and the surfaces of the other keys, each of the keys being operable to generate a respective musical sound by vibrating; and at least one leg attached to the frame or the support structure and operable to support the table top.

19. The table of claim 18 wherein:

the keys each comprise a respective support channel; and the support structure comprises, first and second key-support beams mounted to the frame, first and second key-mounting-member supports respectively mounted to the first and second beams, and first and second key-mounting members respectively mounted to the first and second key-mounting-member supports and respectively extending through the support channels of the keys in the first and second sets.

20. The table of claim 18 wherein:

the frame comprises first and second sides respectively disposed along the first and second sides of the table top:

the first set comprises a plurality of keys operable to generate respective musical sounds that together compose a first musical scale, each of the keys in the first set having a different length than the other keys in the first set and having an edge that is adjacent to the first side of the frame and that is aligned with the frame-adjacent edged of the other keys in the first set; and the second set comprises a plurality of keys operable to generate respective musical sounds that together compose a second musical scale, each of the keys in the second set having a different length than the other keys in the second set and having an edge that is adjacent to the second side of the frame and that is aligned with the frame-adjacent edges of the other keys in the second set, each key in the second set having the same length as a corresponding key in the first set.

21. A table, comprising:

a table top having a planar surface and first and second opposite sides, the table top comprising, a support structure, a first set of keys mounted to the support structure on the first side of the table top, each of the keys having a respective planar surface that composes a respective portion of the table-top surface and that is coplanar with the surfaces of the other keys, each of the keys having an edge that is adjacent to the first side of the table top and that is aligned with the edges of the other keys, each of the keys being operable to generate a respective musical sound by vibrating, a second set of keys mounted to the support structure on the second side of the table top, each of the keys having a respective planar surface that composes a respective portion of the table-top surface and that is coplanar with the surfaces of the other keys in the first and second sets, each of the keys in the second set having an edge that is adjacent to the second side of the table top and that is aligned with the edges of the other keys in the second set, each of the keys in the second set being operable to generate a respective musical sound by vibrating, and at least one table leg attached to the support structure.

22. The table of claim 21 wherein:

the keys in the first set are operable to generate respective musical sounds that together compose a first musical scale, each of the keys in the first set having a different length than the other keys in the first set; and the keys in the second set are operable to generate respective musical sounds that together compose a second musical scale, each of the keys in the second set having a different length than the other keys in the second set and having the same length as a corresponding key in the first set.

23. The table of claim 21 wherein:

the keys in the first set are operable to generate respective musical sounds that together compose a first musical scale, each of the keys in the first set having a different length than the other keys in the first set; and the keys in the second set are operable to generate respective musical sounds that together compose a second musical scale, each of the keys in the second set having a different length than the other keys in the second set, having the same length as a corresponding key in the first set, and arranged adjacent to a respective key in the first set to form a pair of lengthwise adjacent keys, the sum of the lengths of the keys in each pair being the same as the sum of the lengths of the keys in the other pairs.

* * * * *

UNITED STATES PATENT AND TRADEMARK OFFICE
CERTIFICATE OF CORRECTION

PATENT NO : 6,162,976

DATED : December 19, 2000

INVENTOR(S) : Tor C. Clausen

It is certified that error appears in the above-identified patent and that said Letters Patent are hereby corrected as shown below:

In claim 1, line 41, please move the paragraph beginning with "surface" and ending with "and" up one line directly after "planar" to form one paragraph.

In claim 2, line 47, please delete the colon (:) and move the following line directly after "wherein" to form one paragraph.

In claim 5, line 3, after the word "portion", please insert --of--.

In claim 18, line 32, please delete "alone" and insert --along--.

In claim 20, line 4, please delete "edged" and insert --edges--.

Signed and Sealed this

Twenty-ninth Day of May, 2001

*Attest:*

Nicholas P. Godici

NICHOLAS P. GODICI

*Attesting Officer*

*Acting Director of the United States Patent and Trademark Office*